US007449439B2

(12) United States Patent
Ito et al.

(10) Patent No.: US 7,449,439 B2
(45) Date of Patent: Nov. 11, 2008

(54) WATER-SOLUBLE THICKENER AND LIQUID ACIDIC DETERGENT

(75) Inventors: Kenji Ito, Aichi (JP); Yoshio Mori, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 455 days.

(21) Appl. No.: 10/530,179

(22) PCT Filed: Oct. 6, 2003

(86) PCT No.: PCT/JP03/12764

§ 371 (c)(1),
(2), (4) Date: Apr. 4, 2005

(87) PCT Pub. No.: WO2004/031314

PCT Pub. Date: Apr. 15, 2004

(65) Prior Publication Data

US 2006/0046949 A1 Mar. 2, 2006

(30) Foreign Application Priority Data

Oct. 4, 2002 (JP) ............................. 2002-292975
Oct. 4, 2002 (JP) ............................. 2002-292977

(51) Int. Cl.
*C11D 3/37* (2006.01)
*C11D 7/08* (2006.01)
*C08F 12/30* (2006.01)

(52) U.S. Cl. ....................... 510/475; 510/191; 510/199; 510/238; 510/492; 510/499; 526/72; 526/83; 526/85; 526/286; 526/310

(58) Field of Classification Search ................. 510/191, 510/199, 238, 475, 492, 499; 526/72, 83, 526/85, 286, 310
See application file for complete search history.

(56) References Cited

U.S. PATENT DOCUMENTS 3,768,565 A 10/1973 Persinski et al.

(Continued)

FOREIGN PATENT DOCUMENTS

JP 53-46302 A 4/1978

(Continued)

OTHER PUBLICATIONS

International Search Report PCT/JP2003/012764 dated Dec. 9, 2003.

(Continued)

*Primary Examiner*—Brian P Mruk
(74) *Attorney, Agent, or Firm*—Sughrue Mion, PLLC

(57) ABSTRACT

A water-soluble thickener which is highly effective even in thickening strongly acidic aqueous solutions and has excellent stability in such solutions. It comprises a water-soluble copolymer having a weight-average molecular weight of 6,000,000 or higher obtainable by polymerizing a monomer mixture which comprises 2-acrylamido-2-methylpropanesulfonic acid and/or a salt thereof and acrylic acid and/or a salt thereof as essential components and optionally one or more other copolymerizable monomer components including the compound represented by the following Formula (1) and/or a salt thereof, wherein the 2-acrylamido-2-methylpropanesulfonic acid and/or a salt thereof represents 20 mol % or more of all the monomers.

(1)

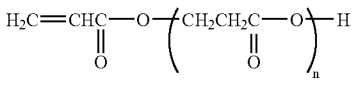

(wherein n is an integer of 1 to 12).

7 Claims, 2 Drawing Sheets

U.S. PATENT DOCUMENTS

| | | | | |
|---|---|---|---|---|
| 3,931,089 | A | 1/1976 | Karl | |
| 6,066,315 | A * | 5/2000 | Melby et al. | 424/70.16 |
| 2004/0028637 | A1 * | 2/2004 | Villard et al. | 424/70.16 |

FOREIGN PATENT DOCUMENTS

| | | | |
|---|---|---|---|
| JP | 04-209700 | A | 7/1992 |
| JP | 09-143498 | A | 6/1997 |
| JP | 9-157130 | A | 6/1997 |
| JP | 10-279636 | A | 10/1998 |
| JP | 2000-44996 | A | 2/2000 |
| JP | 2001-114641 | A | 4/2001 |
| JP | 2001-114642 | A | 4/2001 |
| JP | 2001-115135 | A | 4/2001 |
| JP | 2001-172689 | A | 6/2001 |
| JP | 2001-220545 | A | 8/2001 |
| JP | 2002-275204 | A | 9/2002 |
| WO | WO 00/35961 | A1 | 6/2000 |
| WO | WO 01/97772 | * | 12/2001 |
| WO | WO 01/97772 | A1 | 12/2001 |

OTHER PUBLICATIONS

Database WPI, Section Ch, Week 200155, Derwent Publications Ltd., London, GB, Class A14, AN 2001-499642, Abstract for JP 2001-172689 A (Lion Corp), Jun. 26, 2001.

Database WPI, Section Ch, Week 200343, Derwent Publications Ltd., London, GB, Class A14, AN 2003-451387, Abstract for JP 2002-275204 A (Nippon Kayaku KK), Sep. 25, 2002.

* cited by examiner

WATER-SOLUBLE THICKENER AND LIQUID ACIDIC DETERGENT

TECHNICAL FIELD

The present invention relates to a thickener which is effective even in thickening strongly acidic solutions and is stable in such solutions, and to a liquid acidic detergent consisting of the thickener, which can be used commonly in the relevant field.

BACKGROUND ART

For a detergent used to remove stains on ceramic products such as bathroom tiles, washing stands, toilet bowls, tiles for interior decoration and the like, an acidic detergent comprising hydrochloric acid, citric acid, etc. as a cleaning component, a neutral detergent or a chlorine-based detergent has been used. Conventionally, for such detergents, studies are being carried out on a water-soluble thickener which works effectively upon being mixed into liquid detergents to suitably adjust the viscosity, so that when the liquid detergent is applied on the vertical side of a tile or on a toilet bowl, the liquid detergent flows down on the cleaning surface slowly.

For instance, among the liquid acidic detergents for cleaning tiles which use sulfamic acid and glycolic acid in combination as acidic base materials, an acidic detergent comprising polyvinyl alcohol as a thickener and urea as a stabilizer is disclosed (JP-A-53-46302). This detergent comprises sulfamic acid instead of hydrochloric acid as an acidic base material in consideration of safety. However, since sulfamic acid alone is less effective than hydrochloric acid in the cleaning effect, the detergent uses glycolic acid as an acidic adjuvant. Further, polyvinyl alcohol as a thickener is likely to result in reducing viscosity due to the occurrence of gelation when used at low temperatures in winter, etc.

Further, detergents which comprise a mineral acid such as hydrochloric acid, a halogen scavenger, a surfactant and a thickener as essential components, and which comprise xanthan gum, cationized cellulose, polyethylene glycol, polyvinyl pyrrolidone or polyacrylamide methylpropanesulfonic acid as a thickener are disclosed (for example, in JP-A-9-143498 or JP-A4-209700). Among these, a homopolymer of polyacrylamide methylpropanesulfonic acid shows a thickening effect to the extent that may be obtained by 10% hydrochloric acid, but it is not satisfactory because it cannot satisfy both the fluidity and the anti-dripping property at the same time. None of these thickeners have a sufficient thickening effect under acidic conditions and satisfactory stability over time. Thus, reports have been made upon studies on using a copolymer instead of a homopolymer as a water-soluble thickener.

For instance, reports have been made that a water-soluble thickener comprising a copolymer comprising (meth)acrylamide alkylsulfonic acid and an alkyl group-containing unsaturated monomer (JP-A-10-279636) and a water-soluble thickener comprising a crosslinked copolymer obtained by the polymerization of-(meth)acryl amide alkylsulfonic acid and a crosslinking monomer with (meth)acrylic acid, dialkyl acrylamide, acryloylmorpholine, hydroxyethyl methacrylate, vinyl pyrrolidone or the like, cause a less viscosity reduction under weakly acidic conditions or in brine solutions (JP-A-9-157130, JP-A-2001-114641, JP-A-2001-115135, etc.). These water-soluble thickeners exhibit some thickening effect and the stability in the thickened solution over time under mildly acidic conditions which cause less irritation on the skin when used in the pharmaceutical products, the cosmetic products or the like. However, their thickening effect is unsatisfactory in strongly acidic detergents such as those comprising about 10% by weight of hydrochloric acid and having a pH value of 1 or less.

Moreover, in the processes of preparing copolymers comprising crosslinking monomers as described in JP-A-9-157130, JP-A-2001-114642, JP-A-2001-115135, etc., there are problems that high molecular weight water-soluble polymers having a weight-average molecular weight of more than 5,000,000 are used, and that since full control of the reaction is difficult, and thus water-insoluble polymers which form a molecular structure in the form of three-dimensional network are likely to be produced.

As such, conventional thickeners have exhibited insufficient thickening effect or stability over time in strongly acidic aqueous solutions. In an attempt to enhance the thickening effect of a detergent, an improvement such as increasing the amount of a thickener to be added may be considered, but this causes the reduction in the fluidity of liquid acidic detergents and makes it difficult for the detergent to flow out from the nozzle of a detergent container, thus making it unpleasant to use the detergents. Further, detergents are produced to comprise large amounts of organic materials, which is environmentally not preferable. Also, on the other hand, when the improvement in the fluidity of acidic detergents is made by adjusting the amount of the thickener to be added, there is a problem in that a sufficient anti-dripping property of the detergent on the ceramic surfaces and the like cannot be obtained.

DISCLOSURE OF THE INVENTION

The inventors have conducted extensive studies to solve the above-mentioned problems and have found that water-soluble thickeners consisting of certain copolymers which show excellent thickening effect and stability even in a strongly acidic aqueous solution can solve the problems, thus completing the invention.

Thus, the present invention is characterized by the following.

(1) A first invention is a water-soluble thickener comprising a water-soluble copolymer having a weight-average molecular weight of 6,000,000 or higher obtainable by polymerizing a monomer mixture which comprises 2-acrylamido-2-methylpropanesulfonic acid and/or a salt thereof and acrylic acid and/or a salt thereof as essential components and optionally other copolymerizable monomer components, wherein 2-acrylamido-2-methylpropanesulfonic acid and/or a salt thereof represents 20 mol % or more of all the monomers.

(2) The second invention is a liquid acidic detergent consisting of an aqueous solution which comprises the above-mentioned water-soluble thickener as the essential component, and a mineral acid and/or an organic acid.

REFERENCE NUMERALS

Figure 1:
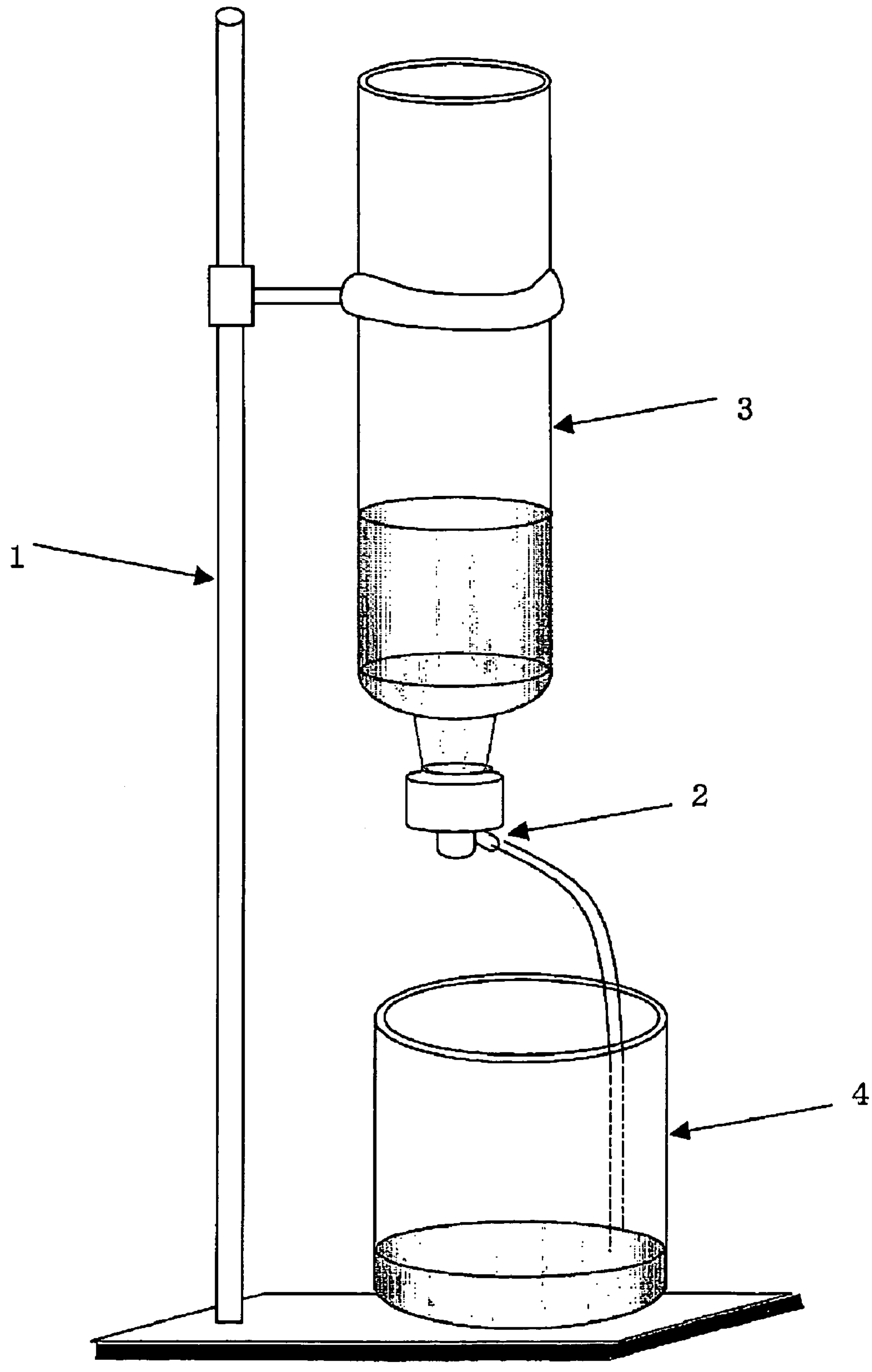
FIG. 1 is a schematic diagram of the equipment used for measuring the fluidity of a liquid acidic detergent.

1 Stand
2 Nozzle of the container
3 Container

4 Beaker
5 Ceramic tile
6 Automatic pipette
7 Angle of inclination
8 Fixing grip

BEST OF CARRYING OUT THE INVENTION

Hereinbelow, the present invention will be explained in detail.

1. Water-soluble Thickener

The water-soluble thickener of the invention is a water-soluble copolymer having a weight-average molecular weight of 6,000,000 or higher obtainable by polymerizing a monomer mixture which comprises 2-acrylamido-2-methyl-propanesulfonic acid and/or a salt thereof and acrylic acid and/or a salt thereof as essential components and optionally the compound represented by the following Formula (1) and/or a salt thereof as another copolymerizable monomer, wherein 2-acrylamido-2-methylpropanesulfonic acid and/or a salt thereof represents 20 mol % or more of all the monomers:

(1)

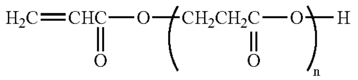

wherein n is an integer of 1 to 12.

1.1 2-Acrylamido-2-methylpropanesulfonic Acid

2-Acrylamido-2-methylpropanesulfonic acid and/or a salt thereof constituting the water-soluble thickener of the invention is used to invest with the solubility of the polymer and the viscosity to an acidic aqueous solution, and the amount thereof to be used is preferably 20 mol % or more, more preferably 20 to 60 mol %, and particularly preferably 30 to 50 mol %, based on the total moles of the monomers. When the amount is less than 20 mol %, the solubility of the polymer in the acidic aqueous solution and the viscosity of the acidic aqueous solution become insufficient.

The salts of 2-acrylamido-2-methylpropanesulfonic acid include, for example, salts of alkali metals such as sodium, potassium, etc., ammonium salts, or salts of organic amines such as triethylamine, triethanolamine, etc.

1.2 Acrylic Acid

The amount of acrylic acid and/or a salt thereof to be used, which constitutes the water-soluble thickener of the present invention is preferably 80 mol % or less, more preferably 40 to 80 mol %, and particularly preferably 50 to 70 mol %, based on the total moles of the monomers. When the amount is more than 80 mol %, the solubility of the polymer in an acidic solution is deteriorated or the thickening efficiency is reduced.

Further, an other copolymerizable monomer is optionally comprised in the monomer mixture, the amount of the acrylic acid and/or a salt thereof to be used is preferably 20 to 80 mol %, and particularly preferably 35 to 70 mol %, based on the total moles of the monomers. When the amount is less than 20 mol %, the dripping-preventing property is insufficient, and when the amount is more than 80 mol %, the solubility of the polymer in an acidic aqueous solution is deteriorated or the thickenability is reduced. The salts of acrylic acid include, for example, salts of alkali metals such as sodium, potassium, etc., ammonium salts, or salts of organic amines such as triethylamine, triethanolamine, etc.

1.3 Other Monomers

The water-soluble thickener of the present invention may comprise other copolymerizable monomers, in addition to the above essential components, within a scope of not reducing the thickening efficiency and the stability in a strongly acidic solution, and the solubility of the obtainable copolymer a strongly acidic solution.

As such other copolymerizable monomers, mention may be made of anionic monomers, nonionic monomers and the like, specific examples of which include the following:

[A] Anionic Monomer (Meth)acrylamide alkylalkanesulfonic acid other than 2-acrylamido-2-methylpropanesulfonic acid, and an alkali metal salt or ammonium salt thereof; methacrylic acid and an alkali metal salt or ammonium salt thereof; maleic acid, fumaric acid, itaconic acid and the like and an alkali metal salt thereof; and vinylsulfonic acid and an alkali metal salt or ammonium salt thereof, etc.

[B] Nonionic Monomer (Meth)acrylamides, dialkyl (meth)acrylamides such as dimethyl (meth)acrylamide, etc., hydroxyalkyl (meth)acrylates such as hydroxyethyl (meth)acrylate, etc., dialkylaminoalkyl (meth)acrylates such as dimethylaminoethyl (meth) acrylate, etc., dialkylaminoalkyl (meth)acrylamides such as dialkylaminopropyl (meth)acrylamide, etc.

[C] Other Monomers

Styrene, acrylionitrile, vinyl acetate, alkyl acrylate, alkyl methacrylate, vinylpyridine, vinylimidazole, allylamine, etc.

[D] Compound Represented by Formula (1)

Among the above-mentioned copolymerizable monomers, it is more preferred to use the compound represented by the following Formula (1) and/or a salt thereof:

(1)

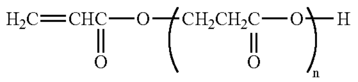

wherein n is an integer of 1 to 12.

The compound of Formula (1) and/or a salt thereof is used to enhance the anti-dripping property of a liquid acidic detergent, but n is an integer in the range of 1 to 12, preferably 1 to 6, and more preferably 1 to 3. Even if n is more than 12, the effect is not expected to improve any further, and it is not preferable because the solubility in a strongly acidic aqueous solution is impaired. This compound may be a single compound with one value of n within said range, or a mixture of a plurality of the compounds with different values of n. Further, a commercially available product can be used as the compound of Formula (1), including a compound under the product name "Aronix M-5600" manufactured by Toagosei Co., Ltd., for example.

The amount of the compound of Formula (1) can be used in the range of preferably 0.1 to 20 mol %, and particularly preferably 0.5 to 15 mol %, based on the total moles of the monomers. When the amount is less than 0.1 mol %, the effect is insufficient, while when the amount is more than 20 mol %, any further improvement on the effect is not expected, and it is not preferable since residual monomers tend to remain.

The salts of the compound of Formula (1) include, for example, salts of alkali metals such as sodium, potassium, etc., ammonium salts, or salts of organic amines such as triethylamine, triethanolamine, etc.

1.4 Process for Producing a Water-soluble Thickener

The synthesis of the water-soluble copolymer of the invention which is a water-soluble thickener may be carried out by means of gel polymerization, aqueous polymerization, inverse suspension polymerization, etc. and from the viewpoint of easy increasing of the molecular weight of the polymer and easy adjusting of the polymerization process or molecular weight, gel polymerization is preferred. The polymerization process may be a batch process or a continuous process, and a continuous process may be specifically exemplified by a continuous belt polymerization in which an aqueous monomer solution is polymerized continuously on a movable belt.

The gel polymerization process is a process employed for the production of polymeric organic flocculant in order to obtain water-soluble polymers of very high molecular weights, and the polymers resulting therefrom can be obtained in the form of gel.

A technical feature of the gel polymerization process is that the concentration of the monomers in the aqueous solution is set to about 20 to 50% by weight, and the amount of the polymerization initiator used is set to a trace amount, i.e., 1000 ppm by weight or less. When polymerization is carried out under these conditions with the initial temperature of the reaction solution set to 5 to 10° C., the reaction solution is converted to a gel of high viscosity, and it becomes impossible to carry out such operations as stirring and removal of heat of the reaction during the reaction. However, by standing the reaction solution as such for a certain period of time, typically a maximum final temperature of 80 to 100° C. is reached, and polymerization is completed to yield a desired water-soluble polymer with high molecular weight.

The initial polymerization temperature for the reaction of gel polymerization is preferably 0 to 30° C., and more preferably 5 to 20° C., and the final polymerization temperature is preferably 70 to 105° C., and more preferably 80 to 100° C. The concentration of monomers may be adjusted so that the initial polymerization temperature and the final polymerization temperature fall within the ranges. Further, the preferred polymerization time is approximately from 30 minutes to 6 hours.

As the polymerization initiator, redox polymerization initiators are preferred, and instead of using a redox polymerization initiator, radical polymerization can be carried out by irradiating an active energy ray such as ultraviolet ray, etc. to an aqueous monomer solution comprising a photopolymerization initiator.

For specific examples of a polymerization initiator, mention may be made of salts of alkali metal persulfate such as sodium persulfate, potassium persulfate, etc. persulfates such as ammonium persulfate, etc., organic peroxides such as hydrogen peroxide, cumene hydroperoxide, benzoyl peroxide, t-butyl peroxide, benzoyl peroxide, etc., and azo compounds such as 2,2'-azobis(4-cyanovaleric acid), 2,2'-azobis (2-methyl-N-(2-hydroxyethyl)-propionamide, 2,2'-azobisisobutyronitrile, etc. and the like. Further, in this case, it is preferable to use salts of transition metals or a salt of hydrogen sulfite, reducing agents for redox formation such as L-ascorbic acid salt), erythorbic acid (salt), amine compounds, or the like in combination.

Furthermore, the amount of the polymerization initiator added is adjusted in accordance with the type of the polymerization initiator used, the composition, the degree of polymerization, the viscosity of the desired polymer, etc. Typically, it is preferable to use 5 to 10,000 ppm by weight, preferably 10 to 5,000 ppm by weight, and particularly 15 to 3,000 ppm by weight, based on the total amount of the monomers.

The molecular weight of the polymer is the weight-average molecular weight measured by aqueous gel permeation chromatography (hereinafter, abbreviated as GPC) using polyethylene oxide as a standard substance. In order to obtain a thickening effect even in a strongly acidic solution, it is necessary that the weight-average molecular weight is necessarily 6,000,000 or higher. A polymer having a weight-average molecular weight of less than 6,000,000 cannot give a sufficient thickening effect.

1.5 Use

The water-soluble thickener of the present invention can be used in a variety of applications.

For example, it can be used as a thickener in neutral or weakly acidic solutions or acidic emulsions in the applications of the pharmaceutical products, the cosmetic products such as cosmetics for skin or hair, etc., building materials such as paper coating, fiber binder, etc., fiber/paper treating agents, paints and the like.

In particular, from the viewpoint of its excellent thickening effect and stability even in a strongly acidic aqueous solution, the acidic detergent comprising hydrochloric acid, citric acid, etc. as a cleaning component is useful in removing stains on the ceramic products such as bathroom tiles, washing stand, toilet bowls, tiles for interior decoration, etc. and the like 2. Liquid Acidic Detergent The liquid acidic detergent of the present invention is an aqueous solution comprising the above-described water-soluble thickener as an essential component and further comprising a mineral acid and/or an organic acid.

2.1 Water-Soluble Thickener

The amount of the above-described water-soluble thickener comprised in the liquid acidic detergent of the present invention varies depending on the type of the thickener used, and the type and the amount of the acids used in the detergent, and thus the amount cannot be determined definitely. However, although it is necessary to adjust the amount of the thickener in order to obtain the desired viscosity for various combinations of liquid acidic detergents in practice, the amount is generally preferably in the range of 0.02 to 5% by weight, and more preferably in the range of 0.1 to 2% by weight. When the amount is less than 0.02% by weight, the thickening effect is insufficient, and when the amount is more than 5% by weight, the viscosity becomes excessively high, and the detergent may become susceptible to remain on the surface upon being washed with water after cleaning.

2.2 Acids

As the mineral acid or organic acid comprised in the liquid acidic detergent of the present invention, mention may be made of mineral acids such as hydrochloric acid, sulfuric acid, nitric acid, phosphoric acid, etc. and organic acids such as acetic acid, citric acid, malic acid, sulfamic acid, glycolic acid, etc. These acids can be used either alone or in combination of two or more species.

The amount of acid comprised in the liquid acidic detergent cannot be defined definitely because different types of acid may result in different detergency or safety. However, the amount is preferably in the range of 3-30% by weight, and more preferably in the range of 5-20% by weight. When the amount is less than 3% by weight, the detergency is insufficient, and when the amount is more than 30% by weight, there may be problems in user safety or of corrosion of the periphery of the places of use (restrooms, bathrooms, etc.) or the like.

2.3 Others

The liquid acidic detergent of the present invention may comprise surfactants in addition to the above-described water-soluble thickeners and acids. As the surfactants, mention may be made of anionic surfactants such as salts of fatty acids, salts of higher alcohol sulfuric esters, salts of liquid fatty oil sulfuric esters, salts of alkylarylsulfonic acids, etc., and nonionic surfactants such as polyoxyethylene alkyl ethers, polyoxyethylene alkyl esters, polyoxyethylene sorbitan alkyl esters, acetylene alcohols, acetylene glycols, etc. and the like. In addition, an antifoaming agent, preservatives, polishing agent, anti-settling agent, chelating agent, anticorrosives, perfumes may be also used in combination.

2.4 Process for Preparation of Liquid Acidic Detergents

The liquid acidic detergent of the present invention can be easily obtained by dissolving the above-described water-soluble thickener and an acid in water. Further, water can be used as long as it is soft water which does not contain alkaline earth metal ions, but it is more preferred that the water is ion-exchanged water (deionized water). Additionally, in order to obtain the detergency, the easy handling (usability) and the stability of the liquid acidic detergent, the viscosity of the liquid acidic detergent at 20° C. is preferably adjusted to 5 to 100 mPa·s, and particularly 10 to 20 mPa·s.

EXAMPLES

Hereinafter, the invention will be explained in more detail by means of Examples and Comparative Examples. The terms "%" and "ppm" in the following mean "% by weight" and "ppm by weight", respectively.

Example 1

645.9 g (50 mol % equivalent) of a 50% by weight aqueous solution of sodium 2-acrylamido-2-methylpropanesulfonate, 184.1 g (25 mol % equivalent) of a 36% by weight aqueous solution of sodium acrylate, 50.8 g (25 mol % equivalent) of acrylic acid and 119.2 g of pure water were mixed to prepare 1 kg of an aqueous monomer solution at a monomer concentration of 44% by weight. This aqueous monomer solution was placed in a Dewar flask made of stainless steel, the temperature inside the reaction vessel was cooled to 5° C., and nitrogen bubbling was carried out for 30 minutes. Then, 10 ppm (converted in terms of the weight of the total amount of the monomers; hereinafter, in the same manner) of t-butyl hydroperoxide, 200 ppm of sodium persulfate and 20 ppm of sodium erythorbate as polymerization initiators were added thereto, and the reaction mixture was left to stand for 8 hours to carry out adiabatic stationary redox polymerization. After completion of 8 hours of reaction, thus produced water-containing gel-like polymer was removed from the reaction vessel and introduced into a chopper, in which the polymer was finely cut into the form of ground meat. Thus cut water-containing gel was dried by a hot air dryer and then further ground by a grinder to yield a desired polymer as powders. This polymer is referred to as A1.

Example 2

916.8 g (80 mol % equivalent) of a 50% by weight aqueous solution of sodium 2-acrylamido-2-methylpropanesulfonate, 65.2 g (10 mol % equivalent) of a 36% by weight aqueous solution of sodium acrylate and 18.0 g (10 mol % equivalent) of acrylic acid were mixed to prepare 1 kg of an aqueous monomer solution at a monomer concentration of 50% by weight. This aqueous monomer solution was placed in a Dewar flask made of stainless steel, the temperature inside the reaction vessel was cooled to 10° C., and nitrogen bubbling was carried out for 30 minutes. Then, 30 ppm of t-butyl hydroperoxide, 200 ppm of sodium persulfate and 20 ppm of sodium erythorbate as polymerization initiators were added thereto. The remainder of the procedure was carried out in the same manner as in Example 1 to yield a desired polymer as powders. This polymer is referred to as A2.

Example 3

In a Dewar flask made of stainless steel as the reaction vessel, 419.4 g (30 mol % equivalent) of a 50% by weight aqueous solution of sodium 2-acrylamido-2-methylpropanesulfonate, 159.3 g (20 mol % equivalent) of a 36% by weight aqueous solution of sodium acrylate, 107.7 g (49 mol % equivalent) of acrylic acid, 5.3 g (1 mol % equivalent) of an acrylic acid dimer (product name "Aronix M-5600"; manufactured by Toagosei Co., Ltd.) and 308.3 g of pure water were mixed to prepare 1 kg of an aqueous monomer solution at a monomer concentration of 38% by weight. The temperature inside the reaction vessel was cooled to 10° C., and nitrogen bubbling was carried out for 30 minutes. Then, 30 ppm (converted in terms of the weight of the total amount of the monomers; hereinafter, in the same manner) of t-butyl hydroperoxide, 200 ppm of sodium persulfate and 20 ppm of sodium erythorbate as polymerization initiators were added thereto, and the reaction mixture was left to stand for 8 hours to carry out adiabatic stationary redox polymerization. After completion of 8 hours of reaction, thus produced water-containing gel-like polymer was removed from the reaction vessel and introduced into a chopper, in which the polymer was finely cut into the form of ground meat. Thus cut water-containing gel was dried by a hot air dryer and then further ground by a grinder to yield a desired polymer as powders. This polymer is referred to as B1.

Example 4

432.1 g (30 mol % equivalent) of a 50% by weight aqueous solution of sodium 2-acrylamido-2-methylpropanesulfonate, 164.2 g (20 mol % equivalent) of a 36% by weight aqueous solution of sodium acrylate, 90.5 g (40 mol % equivalent) of acrylic acid, 54.3 g (10 mol % equivalent) of an acrylic acid dimer (product name "Aronix M-5600"; manufactured by Toagosei Co., Ltd.) and 258.9 g of pure water were mixed to prepare 1 kg of an aqueous monomer solution at a monomer concentration of 42% by weight. The remainder of the procedure was carried out in the same manner as in Example 3 to yield the polymer as powders. This polymer is referred to as B2.

Example 5

656.9 g (50 mol % equivalent) of a 50% by weight aqueous solution of sodium 2-acrylamido-2-methylpropanesulfonate, 112.3 g (15 mol % equivalent) of a 36% by weight aqueous solution of sodium acrylate, 51.6 g (25 mol % equivalent) of acrylic acid, 49.5 g (10 mol % equivalent) of an acrylic acid dimer (product name "Aronix M-5600"; manufactured by Toagosei Co., Ltd.) and 129.7 g of pure water were mixed to prepare 1 kg of an aqueous monomer solution at a monomer concentration of 47% by weight. This aqueous monomer solution was placed in a Dewar flask made of stainless steel, and the temperature inside the reaction vessel was cooled to 5° C., and nitrogen bubbling was carried out for 30 minutes. Then, 10 ppm of t-butyl hydroperoxide, 200 ppm of sodium persulfate and 20 ppm of sodium erythorbate as polymerization initiators were added thereto. The remainder of the procedure was carried out in the same manner as in Example 3 to yield the polymer as powders. This polymer is referred to as B3.

Comparative Example 1

645.9 g (50 mol % equivalent) of an aqueous solution comprising 50% by weight of sodium 2-acrylamido-2-methylpropanesulfonate, 184.1 g (25 mol % equivalent) of an aqueous solution comprising 36% by weight of sodium acrylate, 50.8 g (25 mol % equivalent) of acrylic acid and 119.2 g of pure water were mixed to prepare 1 kg of an aqueous monomer solution at a monomer concentration of 44% by weight. Then, 500 ppm of t-butyl hydroperoxide, 400 ppm of sodium persulfate and 500 ppm of sodium erythorbate as polymerization initiators, and 1200 ppm of 2-mercaptoethanol as a chain transfer agent were added thereto. The remainder of the procedure was carried out in the same manner as in Example 1 to yield the polymer as powders. This polymer is referred to as C1.

Comparative Example 2

150.2 g (10 mol % equivalent) of a 50% by weight aqueous solution of sodium 2-acrylamido-2-methylpropanesulfonate, 385.2 g (45 mol % equivalent) of a 36% by weight aqueous solution of sodium acrylate, 106.2 g (45 mol % equivalent) of acrylic acid and 358.4 g of pure water were mixed to prepare 1 kg of an aqueous monomer solution at a monomer concentration of 32% by weight. This aqueous monomer solution was placed in a Dewar flask made of stainless steel, and the temperature inside the reaction vessel was cooled to 15° C., and nitrogen bubbling was carried out for 30 minutes. Then, 100 ppm of t-butyl hydroperoxide, 300 ppm of sodium persulfate, 50 ppm of sodium erythorbate and 300 ppm of sodium formate as polymerization initiators were added thereto. The remainder of the procedure was carried out in the same manner as in Example 1 to yield the polymer as powders. This polymer is referred to as C2.

[Evaluation of Properties of the Polymer]

The properties of Polymers A1 and A2, and B1 to B3 obtained from Examples 1 to 5, and of Polymers C1 and C2 obtained from Comparative Examples 1 and 2 were evaluated according to the procedures described below. The results are presented in Table 1.

(1) Viscosity of a 0.2% by Weight Aqueous Solution

To 400 ml of pure water, 0.80 g each of the polymers obtained from Examples 1-5 and Comparative Examples 1 and 2 were added, and this mixture was stirred for 3 hours to sufficient dissolution to prepare an aqueous polymer solution at a concentration of 0.2% by weight. The viscosity of this aqueous polymer solution was measured by means of a type B viscometer (manufactured by Tokyo Instruments Co., Ltd.; Mode: type BM) at 30 rpm at 30° C.

(2) pH

The pH value of the aqueous polymer solution at a concentration of 0.2% by weight prepared as in the above was measured by means of a pH meter.

(3) Insoluble Portion 400 ml of the aqueous polymer solution at 0.2% by weight concentration prepared as in the above was filtered through a standard sieve of 83 mesh made of stainless steel (JIS Z 8801, inner diameter: 200 mm), and the amount of the insoluble portion remaining on the filter was measured.

(4) Weight-average Molecular Weight

The molecular weights of the polymers obtained from Examples 1 to 5 and Comparative Examples 1 and 2 were measured by aqueous GPC using an aqueous solution containing sodium sulfate (1.33 g/l) and sodium hydroxide (0.33 g/l) as the solutes. The weight-average molecular weight was calculated from a calibration curve obtained by using polyethylene oxide as a reference substance.

TABLE 1

| Polymer | Monomer Composition ATBS-Na/ANa/AA/M-5600 [mol %] | Viscosity of 0.2% aq. sol. (30° C.) [mPa · s] | pH | Insoluble portion [ml] | Weight-average molecular weight |
|---|---|---|---|---|---|
| A1 | 50/25/25/- | 455 | 6.5 | none | 8,700,000 |
| A2 | 80/10/10/- | 310 | 6.6 | none | 9,500,000 |
| B1 | 30/20/49/1 | 405 | 5.4 | none | 7,500,000 |
| B2 | 30/20/40/10 | 453 | 5.1 | none | 8,400,000 |
| B3 | 50/15/25/10 | 408 | 6.2 | none | 8,100,000 |
| C1 | 50/25/25/- | 16 | 6.5 | none | 800,000 |
| C2 | 10/45/45/- | 450 | 6.4 | none | 7,800,000 |

The abbreviations in the Table indicate the following:

ATBS-Na: sodium 2-acrylamido-2-methylpropane sulfonate

A-Na: sodium acylate

AA: acrylic acid

M-5600: Aronix M-5600 (manufactured by Toagosei Co., Ltd.)

ATBS and Aronix M-5600 are tradenames registered by Toagosei Co., Ltd.

Examples 6 to 19 and Comparative Examples 3 to 8

[Evaluation of Liquid Acidic Detergent]

The polymers obtained from Examples 1 to 5 and Comparative Examples 1 and 2 as described above, were sufficiently stirred in a 10% by weight aqueous solution of hydrochloric acid while adopting the type of thickener (polymer) and the concentration for application as described in Table 2. Then, the mixture was left to stand for 2 days to produce a liquid acidic detergent having 10% by weight of hydrochloric acid.

Evaluations were carried out for the following items using each of the obtained liquid acidic detergents. The results are shown in Tables 2 to 4.

(1) Viscosity: The viscosity of the liquid acidic detergent was measured by means of a type B viscometer under the conditions of 20° C. and 60 rpm.

(2) Fluidity: A commercially available container 3 made of polyethylene having a container nozzle 2 (opening diameter 2.4 mm) was set downward on the stand 1, as illustrated in FIG. 1. 150 g of the liquid acidic detergent prepared as in the above was introduced into the container which had been maintained at 25° C., and the time taken for the detergent liquid to discharge from the container nozzle 2, Tf [sec], was repeatedly measured three times. The average value was used to calculate the flow rate per minute (=fluidity [g/min]) from the equation below:

$$\text{Fluidity[g/min]}=(150\text{[g]}/Tf\text{[sec]}\times 60$$

Figure 2:
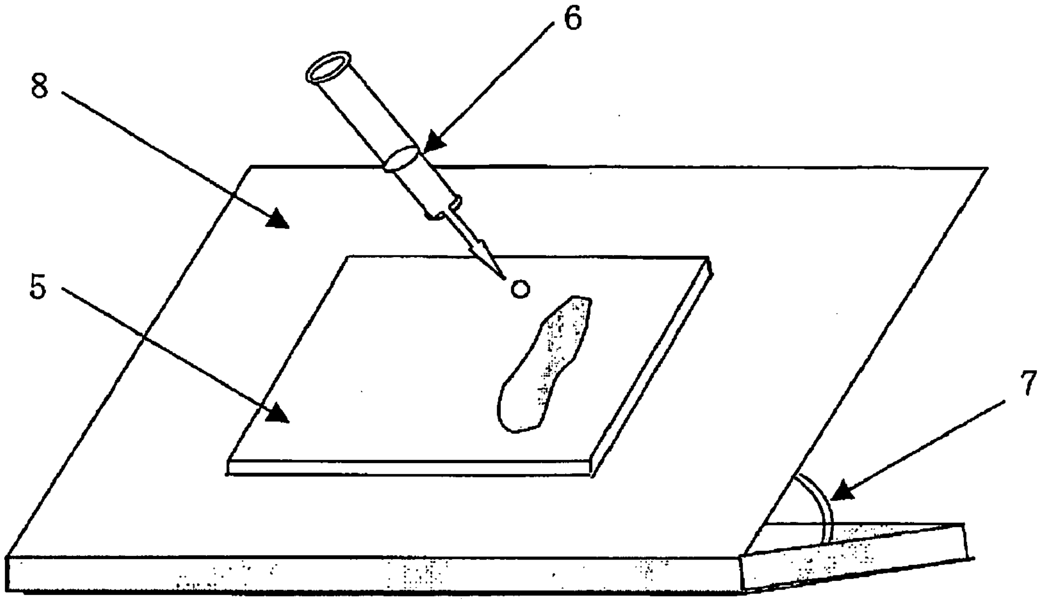
FIG. 2 is a schematic diagram of the equipment used for measuring the dripping rate of a liquid acidic detergent.

(3) Dripping rate: As illustrated in FIG. 2, a ceramic tile 5 with a length of 15 cm on each side was set at an inclination of 17 degrees. 0.30 ml of the above-prepared liquid acidic detergent was drawn with an automatic pipette 6, and then the entire amount of the liquid acidic detergent was dropped vertically onto the tile at a position 3 cm below from the tile edge, in order to repeatedly measure the time taken for the liquid to drip over 10 cm, Td [sec], five times. The average value was used to calculate the dripping distance in 10 seconds (=dripping rate [cm/10 sec]) from the equation below:

$$\text{Dripping rate[cm/10sec]}=(10[m]/Td[sec]\times 10$$

(4) Solubility: The liquid acidic detergent prepared above was evaluated for the dissolved state of the thickener contained therein by visual observation.

○: It is smoothly dissolved into a clear, colorless and homogeneous liquid phase.

x: White or clear insoluble matter is observed.

xx: A large amount of white or clear insolubles are observed.

(5) Stability over time: The prepared liquid acidic detergent was sealed in a heat-resistant bottle made of borosilicate (DURAN® manufactured by SCHOTT) and was stored in a constant temperature/humidity chamber set under the conditions of a temperature of 40° C. and a humidity of 60%. After two weeks and after one month of storage, the properties and aspects of the detergents were evaluated for the items described in the above. The results are shown in Tables 3 and 4.

Comparative Example 9

The same evaluation as described above was performed using a commercially available liquid acidic detergent for bathroom (product name "Sanpore": manufactured by Dainihon Jochugiku Co., Ltd., main components: 9.5% by weight of hydrochloric acid, a surfactant [an alkyl trimethylammonium salt]).

Comparative Example 10

The same evaluation as described above was performed using the same aqueous hydrochloric acid solution as the above solution, except that no thickener (polymer) was added.

As shown in Table 2, the liquid acidic detergent of Examples showed good results as compared with those of Comparative Examples. That is, compared with Comparative Example 9, Examples 6 to 11 using polymers A1 and A2 as a thickener exhibited moderate dripping rates and good fluidity, thus resulting in liquid acidic detergents excellent in the anti-dripping property.

Further, Examples 12 to 19 using polymers B1 to B3 as a thickener also exhibited moderate dripping rates, thus resulting in liquid acidic detergents excellent in the anti-dripping property. In particular, the liquid acidic detergents of Examples 15 to 19 (comprising B2 or B3) were excellent in the dripping rate as well as fluidity.

Meanwhile, in Comparative Examples 3 to 5 using polymer C1 having a weight-average molecular weight of 800,000, in order to obtain viscosity and fluidity values equivalent to those of Comparative Example 9, 6% or more of the thickener was required. Further, even when the application concentration was brought to 6% or higher in order to equal the fluidity with Comparative Example 9, the dripping rate was still high, and the liquid acidic detergents were poor in the anti-dripping property. Furthermore, in Comparative Examples 6 to 8 wherein polymer C2 comprising 10 mol % of ATBS-Na was used, the solubility of the thickener was poor, and thus the products were inappropriate as liquid acidic detergents.

TABLE 3

| | 40° storage stability test(1) Viscosity (20° C.)[mPa · s] | | | 40° storage stability test(2) Fluidity [g/min] | | |
|---|---|---|---|---|---|---|
| | initial | after 2 weeks | after 1 month | initial | after 2 weeks | after 1 month |
| Example 6 | 12 | 12 | 12 | 109 | 110 | 110 |
| Example 7 | 10 | 10 | 10 | 119 | 119 | 120 |
| Example 8 | 8 | 8 | 8 | 125 | 126 | 125 |
| Example 9 | 14 | 14 | 14 | 93 | 93 | 94 |
| Example 10 | 12 | 12 | 12 | 106 | 107 | 107 |
| Example 11 | 10 | 10 | 10 | 118 | 118 | 118 |

TABLE 2

| | Type of thickener | Conc. of thickener | Viscosity (20° C.)[mPa · s] | Fluidity [g/min] | Dripping rate [cm/10 sec] | Solubility of thickener |
|---|---|---|---|---|---|---|
| Example 6 | A1 | 0.5% | 12 | 109 | 12.7 | ○ |
| Example 7 | A1 | 0.4% | 10 | 119 | 13.8 | ○ |
| Example 8 | A1 | 0.3% | 8 | 125 | 16.0 | ○ |
| Example 9 | A2 | 0.6% | 14 | 93 | 22.1 | ○ |
| Example 10 | A2 | 0.5% | 12 | 106 | 24.4 | ○ |
| Example 11 | A2 | 0.4% | 10 | 118 | 26.7 | ○ |
| Example 12 | B1 | 0.9% | 14 | 123 | 6.5 | ○ |
| Example 13 | B1 | 0.8% | 13 | 127 | 7.4 | ○ |
| Example 14 | B1 | 0.7% | 12 | 132 | 8.0 | ○ |
| Example 15 | B2 | 0.9% | 15 | 122 | 4.8 | ○ |
| Example 16 | B2 | 0.8% | 14 | 126 | 6.0 | ○ |
| Example 17 | B3 | 0.7% | 18 | 107 | 6.0 | ○ |
| Example 18 | B3 | 0.6% | 15 | 114 | 7.7 | ○ |
| Example 19 | B3 | 0.5% | 13 | 122 | 9.3 | ○ |
| Comp. Ex. 3 | C1 | 10% | 12 | 106 | 44.4 | ○ |
| Comp. Ex. 4 | C1 | 8.0% | 10 | 118 | 46.7 | ○ |
| Comp. Ex. 5 | C1 | 6.0% | 8 | 128 | 48.2 | ○ |
| Comp. Ex. 6 | C2 | 1.3% | 9 | 130 | 22.6 | xx |
| Comp. Ex. 7 | C2 | 1.1% | 7 | 138 | 24.1 | x |
| Comp. Ex. 8 | C2 | 0.9% | 6 | 142 | 26.0 | x |
| Comp. Ex. 9 | alkyltrimethyl ammonium salt | not defined | 13 | 118 | 40.0 | — |
| Comp. Ex. 10 | none | none | 3 | 172 | 66.0 | — |

TABLE 3-continued

| | 40° storage stability test(1) Viscosity (20° C.)[mPa · s] | | | 40° storage stability test(2) Fluidity [g/min] | | |
|---|---|---|---|---|---|---|
| | initial | after 2 weeks | after 1 month | initial | after 2 weeks | after 1 month |
| Example 12 | 14 | 14 | 14 | 123 | 124 | 123 |
| Example 13 | 13 | 13 | 13 | 127 | 127 | 128 |
| Example 14 | 12 | 12 | 12 | 132 | 132 | 132 |
| Example 15 | 15 | 15 | 15 | 122 | 122 | 122 |
| Example 16 | 14 | 14 | 14 | 126 | 125 | 125 |
| Example 17 | 18 | 18 | 18 | 107 | 107 | 108 |
| Example 18 | 15 | 15 | 15 | 114 | 115 | 114 |
| Example 19 | 13 | 13 | 13 | 122 | 123 | 122 |
| Comp. Ex. 3 | 12 | 12 | 12 | 106 | 106 | 107 |
| Comp. Ex. 4 | 10 | 10 | 10 | 118 | 119 | 119 |
| Comp. Ex. 5 | 8 | 8 | 8 | 128 | 129 | 129 |
| Comp. Ex. 6 | 9 | 8 | 6 | 130 | 135 | 143 |
| Comp. Ex. 7 | 7 | 6 | 5 | 138 | 145 | 154 |
| Comp. Ex. 8 | 6 | 5 | 4 | 142 | 150 | 162 |
| Comp. Ex. 9 | 13 | 13 | 13 | 118 | 118 | 119 |

TABLE 4

| | 40° storage stability test(3) Dripping rate [cm/10 sec] | | | 40° storage stability test(4) Solubility of thickener | | |
|---|---|---|---|---|---|---|
| | initial | after 2 weeks | after 1 month | initial | after 2 weeks | after 1 month |
| Example 6 | 12.7 | 12.4 | 12.6 | ○ | ○ | ○ |
| Example 7 | 13.8 | 13.6 | 13.4 | ○ | ○ | ○ |
| Example 8 | 16.0 | 16.3 | 16.4 | ○ | ○ | ○ |
| Example 9 | 22.1 | 22.3 | 22.0 | ○ | ○ | ○ |
| Example 10 | 24.4 | 24.2 | 24.5 | ○ | ○ | ○ |
| Example 11 | 26.7 | 26.8 | 26.7 | ○ | ○ | ○ |
| Example 12 | 6.5 | 6.1 | 6.3 | ○ | ○ | ○ |
| Example 13 | 7.4 | 7.5 | 7.0 | ○ | ○ | ○ |
| Example 14 | 8.0 | 8.3 | 8.2 | ○ | ○ | ○ |
| Example 15 | 4.8 | 4.5 | 4.3 | ○ | ○ | ○ |
| Example 16 | 6.0 | 5.8 | 6.2 | ○ | ○ | ○ |
| Example 17 | 6.0 | 6.2 | 6.3 | ○ | ○ | ○ |
| Example 18 | 7.7 | 7.8 | 7.7 | ○ | ○ | ○ |
| Example 19 | 9.3 | 9.1 | 9.2 | ○ | ○ | ○ |
| Comp. Ex. 3 | 44.4 | 44.4 | 44.8 | ○ | ○ | ○ |
| Comp. Ex. 4 | 46.7 | 46.9 | 46.5 | ○ | ○ | ○ |
| Comp. Ex. 5 | 48.2 | 48.7 | 48.4 | ○ | ○ | ○ |
| Comp. Ex. 6 | 22.6 | 23.8 | 26.6 | xx | xx | xx |
| Comp. Ex. 7 | 24.1 | 27.1 | 28.2 | x | x | x |
| Comp. Ex. 8 | 26.0 | 28.7 | 30.4 | x | x | x |
| Comp. Ex. 9 | 40.0 | 42.9 | 44.4 | — | — | — |

As shown in Tables 3 and 4, the liquid acidic detergents prepared by using each of the polymers as a thickener were found to be such that the values of their viscosity, fluidity and dripping rate after two weeks and after one month were virtually not changed, and the stability was good.

As shown above, the liquid acidic detergents comprising water-soluble thickeners which were prepared by copolymerization with appropriate weight-average molecular weights and appropriate composition ranges, showed excellent storage stability, good and suitable fluidity and anti-dripping property.

INDUSTRIAL APPLICABILITY

The water-soluble thickener of the present invention shows excellent thickening effect even in a strongly acidic aqueous solution, and the liquid acidic detergents comprising said thickener shows excellent stability and appropriate fluidity and stays suitably on the surface to be cleaned. Thus, the liquid acidic detergent can exhibit satisfactory usability and detergency as a detergent, thus being highly useful.

The invention claimed is:

1. A water-soluble thickener comprising a water-soluble copolymer having a weight-average molecular weight of 6,000,000 or higher obtainable by polymerizing a monomer mixture which comprises 2-acrylamido-2-methylpropanesulfonic acid and/or a salt thereof and acrylic acid and/or a salt thereof and optionally other copolymerizable monomer components, wherein 2-acrylamido-2-methylpropanesulfonic acid and/or a salt thereof is present in an amount of 20 mol % or more of all the monomers, wherein the monomer mixture comprises a compound represented by the following formula (1):

(1)

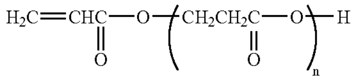

wherein n is an integer of 1 to 12, and/or a salt thereof as the other copolymerizable monomer components, wherein the amount of the compound of formula (1) and/or a salt thereof, is in the range of 0.1 to 20 mol % based on the total moles of all the monomers, and wherein the monomer mixture comprises 20 to 80 mol % of acrylic acid and/or salt thereof, based on the total moles of the monomers.

2. An aqueous acidic detergent solution which comprises a mineral acid and/or an organic acid and the water-soluble thickener according to claim 1.

3. An aqueous acidic detergent solution which comprises 3 to 30% by weight of a mineral acid and/or an organic acid and 0.02 to 5% by weight of a water-soluble thickener comprising a water-soluble copolymer having a weight-average molecular weight of 6,000,000 or higher obtainable by polymerizing a monomer mixture which comprises 20 mol % or more of 2-acrylamido-2-methylpropanesulfonic acid and/or a salt thereof, 20 to 80 mol % of acrylic acid and/or a salt thereof, and a compound formula (1) as defined in claim 1 and/or a salt thereof, in an amount of 0.1 to 20 mol %, wherein the amounts each are based on the total moles of all the monomers.

4. A thickening method comprising a step of adding the following water soluble copolymer to an acidic aqueous solution or an acidic emulsion:

a water-soluble copolymer having a weight-average molecular weight of 6,000,000 or higher obtainable by polymerizing a monomer mixture which comprises 2-acrylamido-2-methylpropanesulfonic acid and/or a salt thereof and acrylic acid and/or a salt thereof and optionally other copolymerizable monomer components, wherein the amount of 2-acrylamido-2-methylpropanesulfonic acid and/or a salt thereof is 20 mol % or more, wherein the monomer mixture comprises 20 to 80 mol % of acrylic acid and/or salt thereof is 20 to 80 mol %, each based on the total moles of the monomers, wherein the monomer mixture comprises a compound represented by the following formula (1):

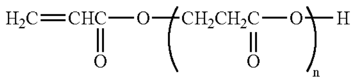

(1)

wherein n is an integer of 1 to 12, and/or a salt thereof as other copolymerizable monomer components in an amount of 0.1 to 20 mol % based on the total moles of all the monomers.

5. An aqueous acidic detergent solution which comprises 3 to 30% by weight of a mineral acid and/or an organic acid and 0.2 to 5% by weight of the water-soluble thickener according to claim 2.

6. An aqueous acid detergent solution according to claim 2, wherein the detergent solution is strongly acidic.

7. The water-soluble thickener according to claim 1, wherein the amount of the compound of formula (1) is in the range of 0.5 to 15 mol % based on the total moles of all the monomers.

* * * * *